United States Patent
Pirich (10) Patent No.: US 6,188,676 B1
(45) Date of Patent: Feb. 13, 2001

(54) COMBINED CONFERENCING AND CALLING

(75) Inventor: Christopher M. Pirich, Seattle, WA (US)

(73) Assignee: Microsoft Corporation, Redmond, WA (US)

( * ) Notice: Under 35 U.S.C. 154(b), the term of this patent shall be extended for 0 days.

(21) Appl. No.: 08/950,314

(22) Filed: Oct. 14, 1997

(51) Int. Cl.⁷ .................................................. H04Q 11/04
(52) U.S. Cl. .............................................................. 370/261
(58) Field of Search ..................................... 370/260, 261, 370/262, 401, 389, 315, 259, 264, 265, 270, 271, 522, 441, 400, 406, 407, 408, 410, 465, 466, 93.01, 93.04, 95.15, 201, 202, 205, 207, 219, 220, 225, 226, 229, 230–234, 242; 379/201

(56) References Cited

U.S. PATENT DOCUMENTS

| | | | |
|---|---|---|---|
| 5,680,392 | * 10/1997 | Semaan | 370/261 |
| 5,754,775 | * 5/1998 | Adamson et al. | 370/261 |
| 5,841,976 | * 11/1998 | Tai et al. | 370/260 |
| 5,867,494 | * 2/1999 | Krishnaswamy et al. | 370/352 |
| 5,909,431 | * 6/1999 | Kuthyar et al. | 370/260 |

OTHER PUBLICATIONS

"H.323 Overview", H.323 ITU Standards, http://www.imtc.org/imtc/i/standard/itu/i_h323.htm, pp. 1–4 (Printed Oct. 7, 1997).

"T.120 Overview", T.120 Standard, http://www.itmc.org/imtc/i/standard/itu/i_t120.htm, pp. 1–7 (printed Oct. 7, 1997).

* cited by examiner

Primary Examiner—Dang Ton
(74) Attorney, Agent, or Firm—Schwegman, Lundberg, Woessner & Kluth, P.A.

(57) ABSTRACT

The invention discloses combined conferencing and calling. In one embodiment, a computerized system has at least a first and a second node. The second node initiates a conference, such as a T.120 conference, and a call, such as an H.323 call, with the first node. To a user at each of the nodes, initiation of the H.323 call between the first and the second nodes appears imperceptible as separate from initiation of the T.120 conference.

9 Claims, 5 Drawing Sheets

COMBINED CONFERENCING AND CALLING

FIELD OF THE INVENTION

This invention relates generally to point-to-point calling and multi-point calling (conferencing), and more specifically to such calling and conferencing that is combined with one another.

BACKGROUND OF THE INVENTION

Current trends in computing suggest that computers are becoming networked to one another on a greater and greater scale. For example, computers that previously were connected to other computers in the same building over a local-area network (LAN) are now commonly connected to other computers all over the world over a wide-area network (WAN), an intranet, or the Internet. The rising prominence of the Internet in fact presages a future where all computers are able to connect with one another over a single vast global network.

With this rise in connectivity has come a proliferation of standards governing point-to-point calling, and multi-point calling (conferencing). Point-to-point calling enables a user at one computer to communicate with a user at another computer, where both computers are connected to one another over a network such as the Internet. A point-to-point call only permits two users to communicate with each other; if one of these users wishes to communicate with a third user at a different computer, the user would first have to disconnect the present point-to-point call and establish a new point-to-point call.

Multi-point calling is better known as conferencing. Conferencing enables a plurality of users at their respective computers to communicate with one another, where all the computers are connected to each other over a network such as the Internet. A multi-point call or conference usually allows new users to join an existing conference without having to first terminate the conference. With both point-to-point and multi-point calls, the communications may be data—e.g., text, graphics, and/or files—or multimedia, such as audio and/or video.

A standard for point-to-point calling known within the art is H.323. H.323 calling permits multimedia communication such as audio and/or video communication between the users at two different computers commonly connected H.323 calling is occasionally said to govern multimedia conferencing between two computers; however, this nomenclature is inaccurate in that the H.323 standard generally only permits point-to-point calling, and not true multi-point calling (as those of ordinary skill within the art know, the H.323 standard does permit point-to-point call if a Multi-point Control Unit (MCU) is present, which is typically an additional server computer). Further description regarding the H.323 standard is described at the Internet web site http://www.imtc-org/imtc/i/standard/itu/i_h323.htm, which is hereby incorporated by reference.

A standard for multi-point calling known within the art is T.120. T.120 conferencing permits data communication among users at different computers commonly connected (e.g., text, graphics, and/or files). T.120 conferencing, besides data sharing, also permits document conferencing, specifying the efficient and reliable distribution of files and graphical information in real time in a multi-point call (conference). Further description regarding the T.120 standard is described at the Internet web site http://www.imtc.org/imtc/i/standard/itu/i_t120.htm, which is hereby incorporated by reference.

A disadvantage with the proliferation of standards governing multi-point and point-to-point calls is that unsophisticated users may become confused at the prospect of two or more concurrent calls with the same computer. For example, a user may participate in a T.120 conference to share computer files with other users, or exchange typed textual messages with them (commonly known as "chatting") Concurrently, the user may also initiate an H.323 call with one of these users, to communicate in a multimedia manner (e.g., audio-only, or both audio and video). The user, therefore, may become confused by the fact that he or she has to initiate two separate calls: a T.120 conference to share computer files and exchange typed textual messages, and an H.323 call to communicate in a multimedia manner. The concept of communicating with the same user by two different concurrent calls, as is possible by the proliferation of standards governing such multi-point and point-to-point calls, is therefore unintuitive at best to such users.

SUMMARY OF THE INVENTION

The above-mentioned shortcomings, disadvantages and problems are addressed by the present invention, which will be understood by reading and studying the following specification. The invention describes combined conferencing and calling, relative to a computerized system having at least two nodes. One node initiates both a conference and a call with another node, such that to the users at these nodes, initiation of the call between the nodes does not appear as separate from initiation of the conference between the nodes.

For example, a first node may initiate both a T.120 conference and an H.323 call with a second node. To the user at each of the first and the second node, however, initiation of the H.323 call appears imperceptible from initiation of the T.120 conference. That is, the users see the initiation of both the call and the conference as a single call or conference, and thus are less apt to become confused. In other words, the invention makes the initiation of both a call and a conference more intuitive to users. This is an advantage of the invention.

The present invention describes systems, nodes, methods, and computer-readable media of varying scope. In addition to the aspects and advantages of the present invention described here, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, methods for an exemplary embodiment are provided. In the fourth section, a conclusion of the detailed description is described.

Hardware and Operating Environment

Figure 1:
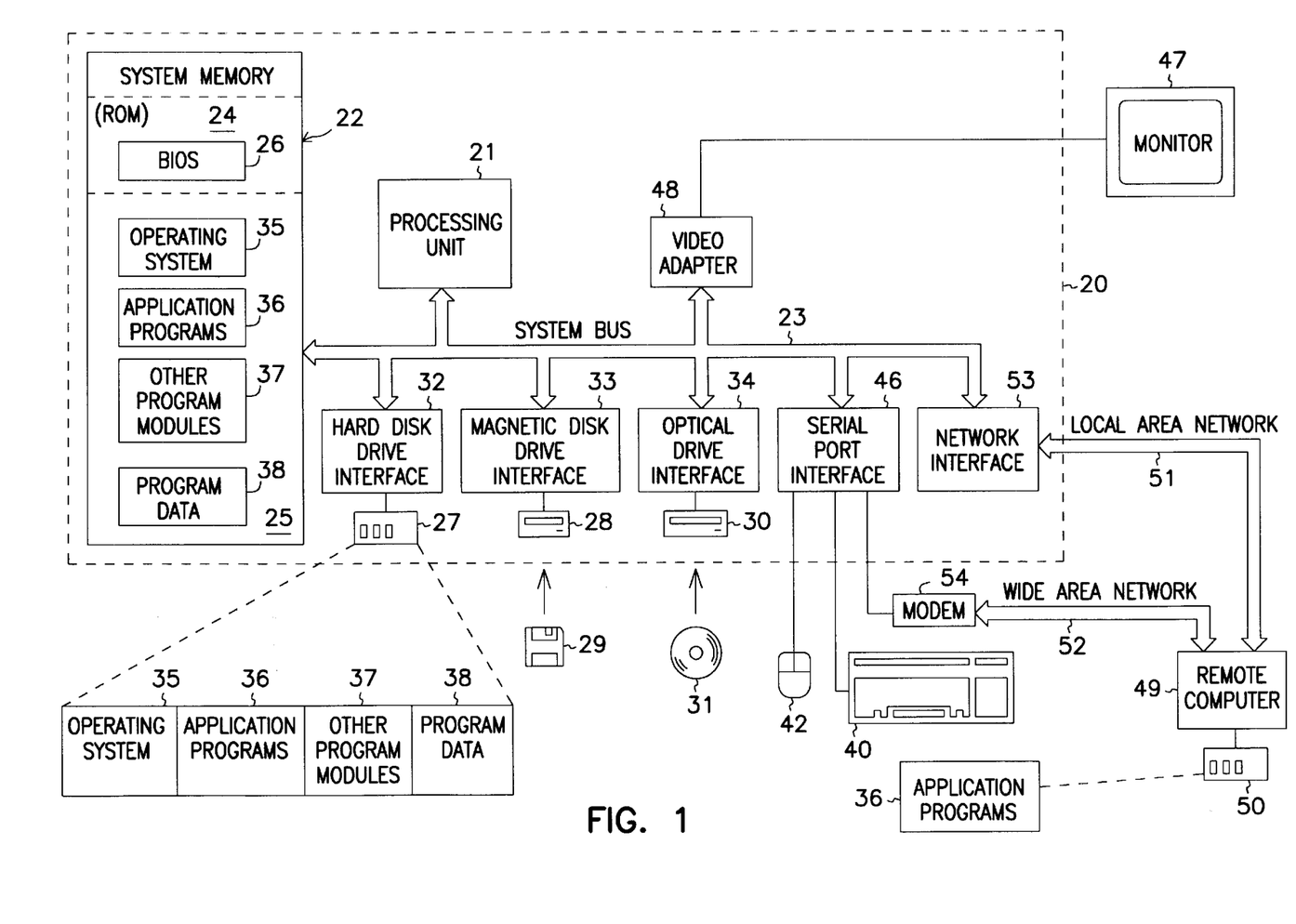
FIG. 1 is a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2A:
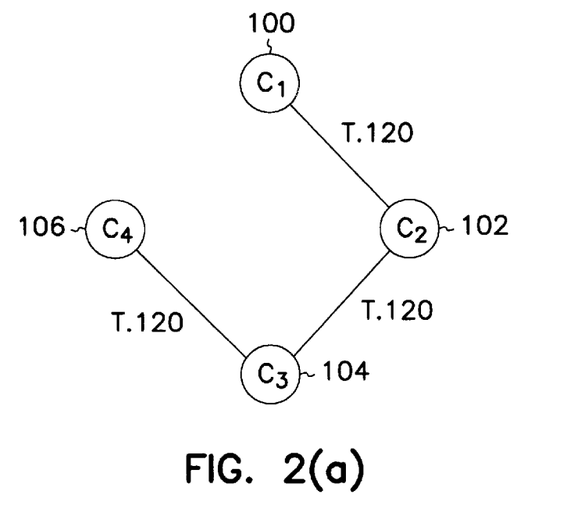
FIGS. 2(a), 2(b), and 2(c) are diagrams illustrating a system-level overview of an exemplary inventive embodiment; and, FIGS. 3(a), 3(b), and 4 are flowcharts of a method in accordance with to an exemplary embodiment of the invention.
Figure 2B:
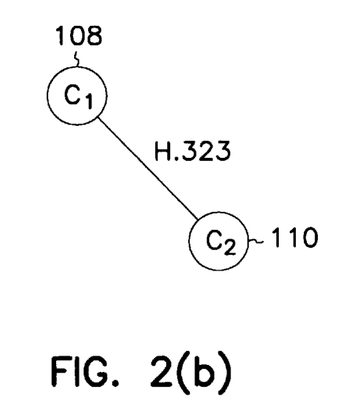
Figure 2C:
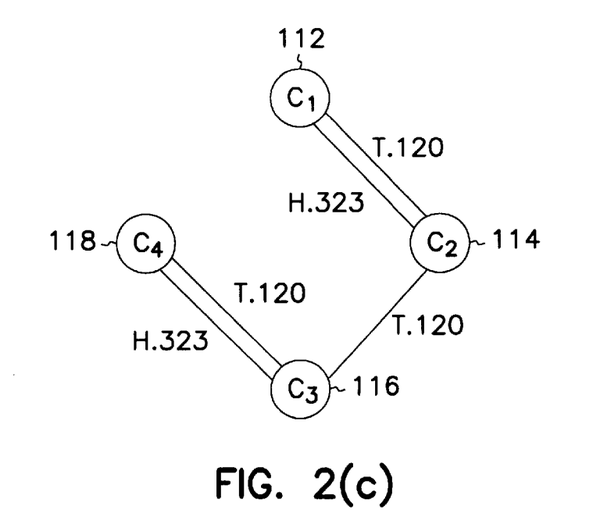

A system level overview of the operation of an exemplary embodiment of the invention is described by reference to FIGS. 2(a)–2(c). A diagram of exemplary T.120 conferencing, as known in the art, is shown in FIG. 2(a), while a diagram of exemplary H.323 calling, as also known in the art, is shown in FIG. 2(b). A diagram of combined T.120 conferencing and H.323 calling, in conjunction with which an embodiment of the invention governs initiation of such conferencing and calling, is shown in FIG. 2(c).

Referring first to FIG. 2(a), a diagram of four computer nodes participating in a T.120 multi-point call, or conference, is shown. Each of nodes 100, 102, 104 and 106 is a computer, such as the computer 20 of FIG. 1, although the invention is not so limited. Each of nodes 100, 102, 104 and 106 includes a communications device (not shown) so that they may participate in the T.120 conference over a common network, such as the Internet. Finally, each of nodes 100, 102, 104 and 106 has a computer-readable media, such as a memory, to store data and computer programs, and a processor to execute the programs from the media.

As shown in FIG. 2(a), nodes 100, 102, 104 and 106 are in a T.120 conference with one another. Thus, each of the nodes has T.120 conferencing capability. As has been described in the background section, a T.120 conference permits commonly connected computers to exchange data with one another, such as text, graphics, and/or files. Thus, nodes 100, 102, 104 and 106 may exchange such data with one another.

The establishment of the T.120 conference is not limited to any particular sequence; however, in one embodiment, node 100 first contacts node 102, and determines whether node 102 has T.120 conferencing capability. Once node 100 determines that node 102 has such capability, node 100 initiates a T.120 conference, and invites node 102 to join the conference, and node 102 joins the conference. Node 102 may then contact node 104, and determine whether node 104 has T.120 capability. Once node 102 determines that node 104 has such capability, node 102 invites node 104 to join the existing conference, and node 104 joins the conference. Finally, node 104 may then contact node 106, and determine whether node 106 has T.120 capability. Once node 104 determines that node 106 has such capability, node 104 invites node 106 to join the conference, and node 106 does so.

Referring next to FIG. 2(b), a diagram of two computers participating in an H.323 point-to-point call is shown. For the purposes of this application, when the term "call" is used without preface by "multi-point," it is assumed that the term applies to a point-to-point call, such as an H.323 call. When the term "call" is used with preface by "multi-point," such a call is a conference, such as a T.120 conference.

Each of nodes 108 and 110 of FIG. 2(b) is a computer, such as the computer 20 of FIG. 1, although the invention is not so limited. Each of the nodes includes a communications device (not shown) so that they may participate in the H.323 call over a common network, such as the Internet. Finally, each of nodes 108 and 110 has a computer-readable media, such as a memory, to store data and computer programs, and a processor to execute the programs from the media.

As shown in FIG. 2(b), nodes 108 and 110 are in a H.323 call with one another. Thus, each of the nodes has H.323 calling capability. As has been described in the background section, an H.323 call permits commonly connected computers to communicate in a multimedia manner with one another, such as via sound and/or video. Thus, nodes 108 and 110 may communicate with each other in such a multimedia manner. The establishment of the H.323 call is not limited to any particular sequence; however, in one embodiment, node 108 first contacts node 110, and determines whether node 110 has H.323 calling capability.

Finally, referring to FIG. 2(c), a diagram of four nodes participating concurrently in a T.120 conference, two of which are also participating in an H.323 call, is shown. As will be described, the initiation of the T.120 conference and the h.323 call is in accordance with one embodiment of the invention. Each of nodes 112, 114, 116 and 118 is a computer, such as the computer 20 of FIG. 1, although the invention is not so limited. Each of nodes 112, 114, 116 and 118 includes a communications device (not shown) so that they may participate in the conference and the one of the calls over a common network, such as the Internet. Finally, each of nodes 112, 114, 116 and 118 has a computer-readable media, such as a memory, to store data and computer programs, and a processor to execute the programs from the media.

As shown in FIG. 2(c), nodes 112, 114, 116 and 118 are in a T.120 conference with one another. Thus, each of the nodes has T.120 conferencing capability. As has been described in the background section, a T.120 conference permits commonly connected computers to exchange data with one another, such as text, graphics, and/or files. Thus, nodes 112, 114, 116 and 118 may exchange such data with one another.

As also shown in FIG. 2(c), nodes 112 and 114 are in one H.323 call with each other. Thus, each of the nodes has H.323 calling capability. As has been described in the background section, an H.323 call permits commonly connected computers to communicate in a multimedia manner with one another, such as via sound and/or video. Thus, nodes 112 and 114 may communicate with each other in such a multimedia manner.

The establishment of the T.120 conference and the H.323 call of FIG. 2(c) is not limited to any particular sequence. However, the establishment of the T.120 conference and the H.323 call is initiated such that the users at the nodes in both the conference and the call do not sense that a separate conference and a separate call are being established. That is, to the users at nodes 112 and 114, initiation of the H.323 call between nodes 112 and 114 appears imperceptible as separate from the initiation of the T.120 conference. These users "see" only the initialization or establishment of only one logical route of communication between nodes 112 and 114, which includes capability to communicate via data (T.120) and multimedia (H.323). This logical route thus includes both the T.120 conference and the H.323 call.

In one embodiment, node 112 first contacts node 114, and determines whether node 114 has T.120 conferencing capability. Once node 112 has so determined, node 112 initiates a T.120 conference, and invites node 114 to join the conference, and node 114 joins the conference. Node 112 next determines whether node 114 has H.323 calling capability. Once node 112 has so determined, node 112 establishes an H.323 call (assuming that node 114 is not already in an existing H.323 call) between itself and node 114. To the users at each of these nodes, however, the establishment of a T.120 conference and an H.323 call is not seen as separate to one another.

Next, node 114 may then contact node 116, and determine whether node 116 has T.120 capability. Once node 114 determines that node 116 has such capability, node 114 invites node 116 to join the existing conference, and node 116 joins the conference. Finally, node 116 may then contact node 118, and determine whether node 118 has T.120 capability. Once node 116 determines that node 118 has such capability, node 116 invites node 118 to join the existing conference, and node 118 joins the conference. Node 116 then establishes an H.323 call with node 118 in the same manner as node 112 did so with node 114 (i.e., one that is transparent to the users of the nodes vis-a-vis the initiation of the T.120 conference). Thus, a T.120 conference "line of communication" is established between nodes 112 and 114, between nodes 114 and 116, and between nodes 116 and 118. Furthermore, an H.323 call is established between nodes 112 and 114, and between nodes 116 and 118, and is depicted as a separate "line of communication" in FIG. 2(c).

That the users of nodes 112 and 114 do not sense that the establishment of two separate routes of communication are occurring—a T.120 conference and a H.323 call—is an advantage of the invention. As appearing to these users, the establishment of the two separate routes of communications seems a single routine of communication. This is more intuitive to the users, who may not understand that different standards govern different forms of communication, even if conducted with the same other node. Thus, the invention decreases potential that such users may become confused when using a node having such combined calling and conferencing capability.

A system level overview of the operation of an exemplary embodiment of the invention has been described. The establishment of both a conference and a call between two nodes, such that the users at those nodes may utilizes different forms of communications as afforded by the standards governing the conference and the call, is such that to the users it appears that only a single route of communication is being established.

Methods of an Exemplary Embodiment of the Invention

In the previous section, a system level overview of the operation of an exemplary embodiment of the invention was described. In this section, particular methods performed by nodes of such an exemplary embodiment are described by reference to a series of flowcharts. The methods to be performed by the nodes constitute computer programs made up of computer-executable instructions. Describing the methods by reference to a flowchart enables one skilled in the art to develop programs including instructions to carry out the methods on a suitable computerized node computer (the processor of the computer executing the instructions from computer-readable media).

Figure 3A:
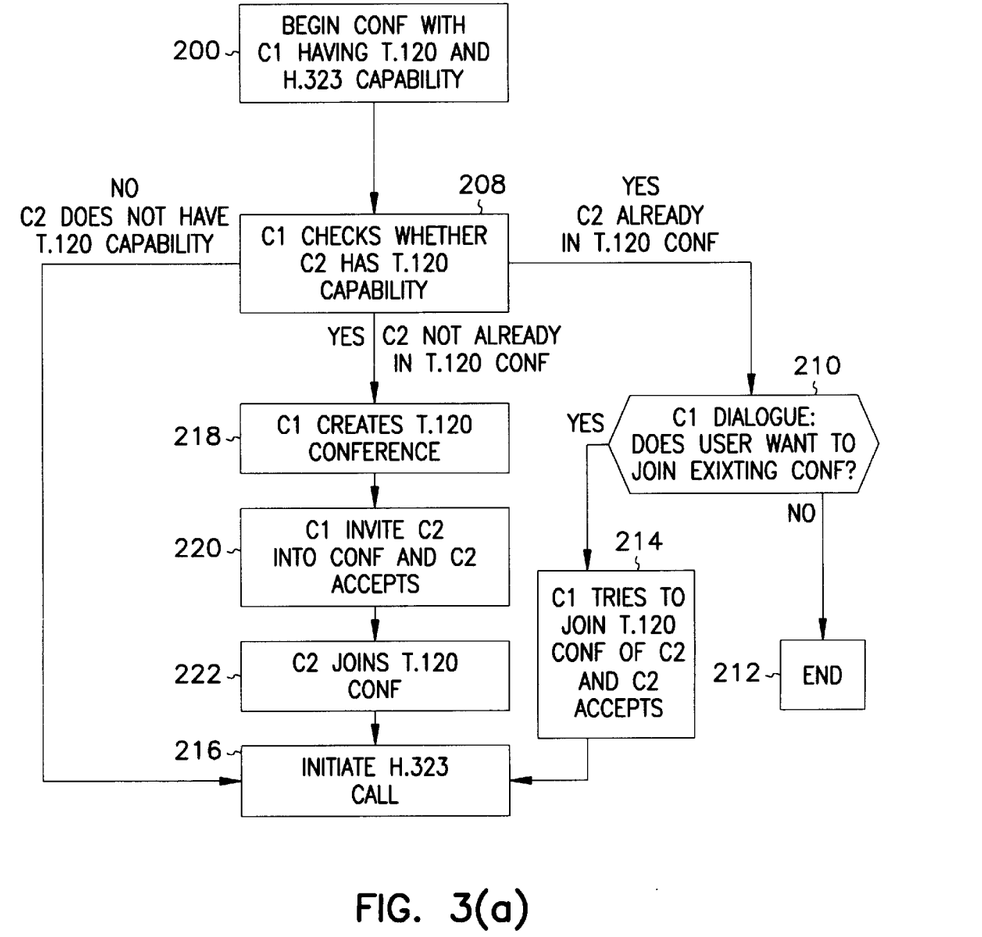
Figure 3B:
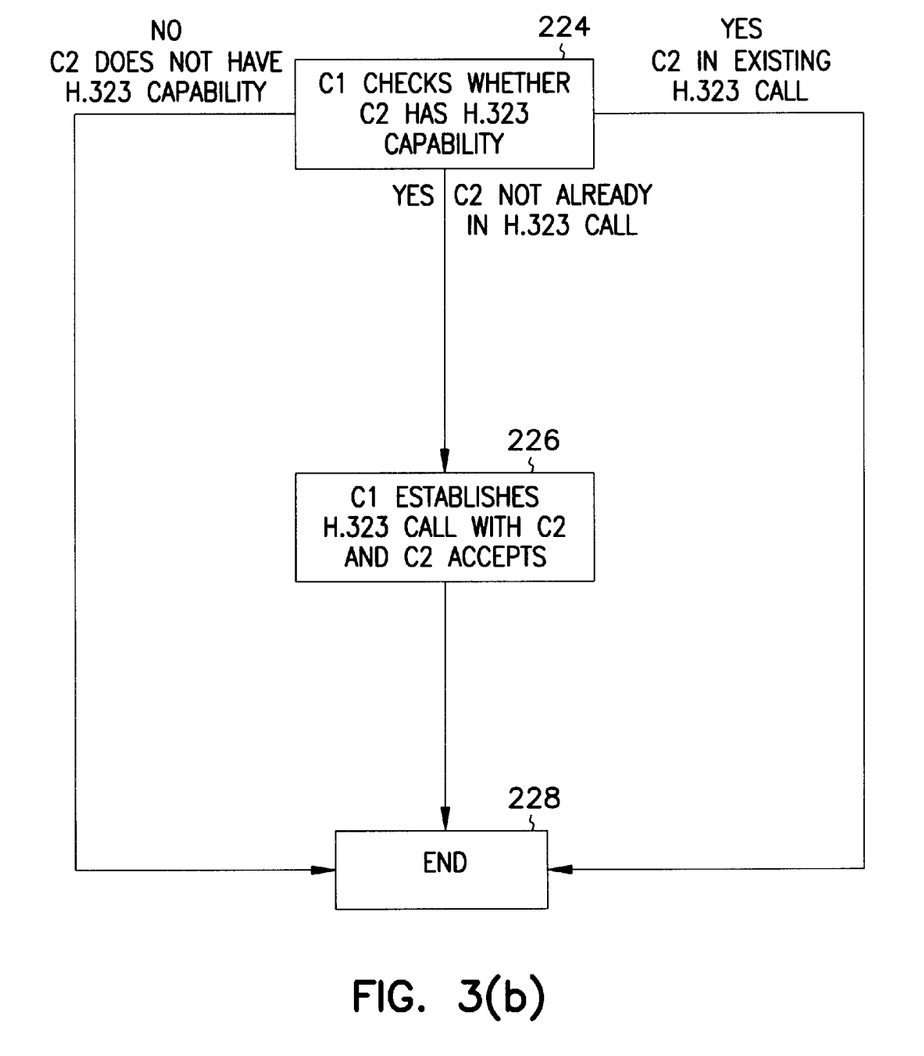

Referring first to FIG. 3(a) and FIG. 3(b), a flowchart of a computerized method according to an exemplary embodiment of the invention is shown. This method is inclusive of the steps or acts required to be taken by a first node C1 and a second node C2 such that the first node initiates a T.120 conference and a H.323 call with the second node in a manner that the users at each of these nodes do not recognize that a separate conference and a separate call are being established. From the starting point of step 200 of FIG. 3(a), in step 208 the node C1 determines whether the node C2 has T.120 conferencing capability, via a T.120 QueryRemote operation, as known within the art. If the T.120 QueryRemote operation fails, this means that node C2 does not have T.120 capability, and an H.323 call is attempted to be initiated in step 216, as will be described below. Before the H.323 call is attempted, however, node C2 preferably presents a dialog box, as known within the art, to its user to determine whether the user in fact wishes to conference with the user of node C1. If the user does not, then the method ends.

If the T.120 QueryRemote operation succeeds, one of two situations may occur: node C2 is already in a T.120 conference, or node C2 is not in a T.120 conference currently. In the former case, where node C2 is already in a T.120 conference, in step 210 node C1 preferably presents a dialog box to its user to determine whether the user wishes to join the conference that node C2 is already in. If the user does not, then the method ends in step 212. Otherwise, the method proceeds to step 214. In step 214, node C2 preferably presents a dialog box, as known within the art, to its user to determine whether the user wishes to conference with the user of node C1. If the user does not, then the method ends. If the method does not end, node C1 tries to join the T.120 conference of node C2, and node C2 accepts, still in step 214. Thus, node C1 issues a T.120 join command, and node C1 joins the T.120 conference. The method then proceeds to step 216, for initiation of an H.323 call, as will be described below.

In the latter case, where node C2 is not already in a T.120 conference, in step 218 node C1 creates a T.120 conference, and in step 220 issues a T.120 Invite command to node C2. Also in step 220, node C2 preferably presents a dialog box, as known within the art, to its user to determine whether the user wishes to conference with the user of node C1. If the user does not, then the method ends. However, assuming that the method does not end, node C2 accepts the invitation, and joins the conference in step 222. The method then proceeds to step 216, for initiation of an H.323 call.

From step 216, the method proceeds to step 224 of FIG. 3(b). In step 224, node C1 determines whether node C2 has H.323 capability. The manner by which this is accomplished is not limited by the invention; in one embodiment, node C1 proceeds to make an H.323 call to node C2, and if node C2 does not respond at all, then node C1 concludes that node C2 does not have H.323 calling capability. If node C2 does not have H.323 capability, the method of FIG. 3(a) and FIG. 3(b) ends at step 228. If node C2 does have H.323 capability, however, and is not currently in a call, C1 establishes an H.323 call with C2, and C2 accepts the H.323, in step 226, and the method of FIG. 3(a) and FIG. 3(b) ends at step 228. If node C2 is in an existing H.323 call, the method also ends at step 228.

Note in the situation where node C2 has both T.120 conferencing and H.323 calling capability, and is currently not in either an existing T.120 conference or H.323 call, that the invention establishes such a conference and a call in a manner in which the separate nature of the conference and the call is transparent to the user at node C1 and the user at node C2. For example, the user at node C1 just knows that it is beginning a "conference" in step 200, not knowing that in fact both a T.120 conference and an H.323 call is going to be initiated. Similarly, the user at node C2 is asked once in step 220 if it wishes to "conference" with the user at node C1. If it responds yes, both a T.120 conference and an H.323 call are established—the fact that both are established is transparent to the user. That is, the T.120 conference and H.323 calls are not exposed as a separate conference and a separate call to the user. This is an advantage of the invention.

Preferably, in order to create a combined conference, each node in the T.120 conference adds its network address or addresses to the T.120 conference roster. As a matter of course, as part of the T.120 standard, this roster is maintained such that each time a node joins or leaves the T.120 conference, the roster of the participants is updated. Besides the network address or addresses of each node within the roster, in one embodiment, data in the form of an application specific extension is added the roster entry of each node to indicate whether the node is also in an audio call, or a video call (i.e., such data is encoded as T.120 roster data with a registered H.221 application key, as known within the art, and a specifically designated GUID, as also known within the art). That a given node is in an audio call or a video call typically necessarily means that this node is in an H.323 call.

Thus, in this embodiment of the invention, a given node may examine the T.120 conference roster to determine what other nodes are present in the conference, and whether the other nodes are also present in an audio or a video call (that is, an H.323 call). Also in this embodiment of the invention, each node updates its entry in the roster as it starts or ends an audio or video call, so that the T.120 conference roster remains up to date and accurate at all times.

Figure 4:
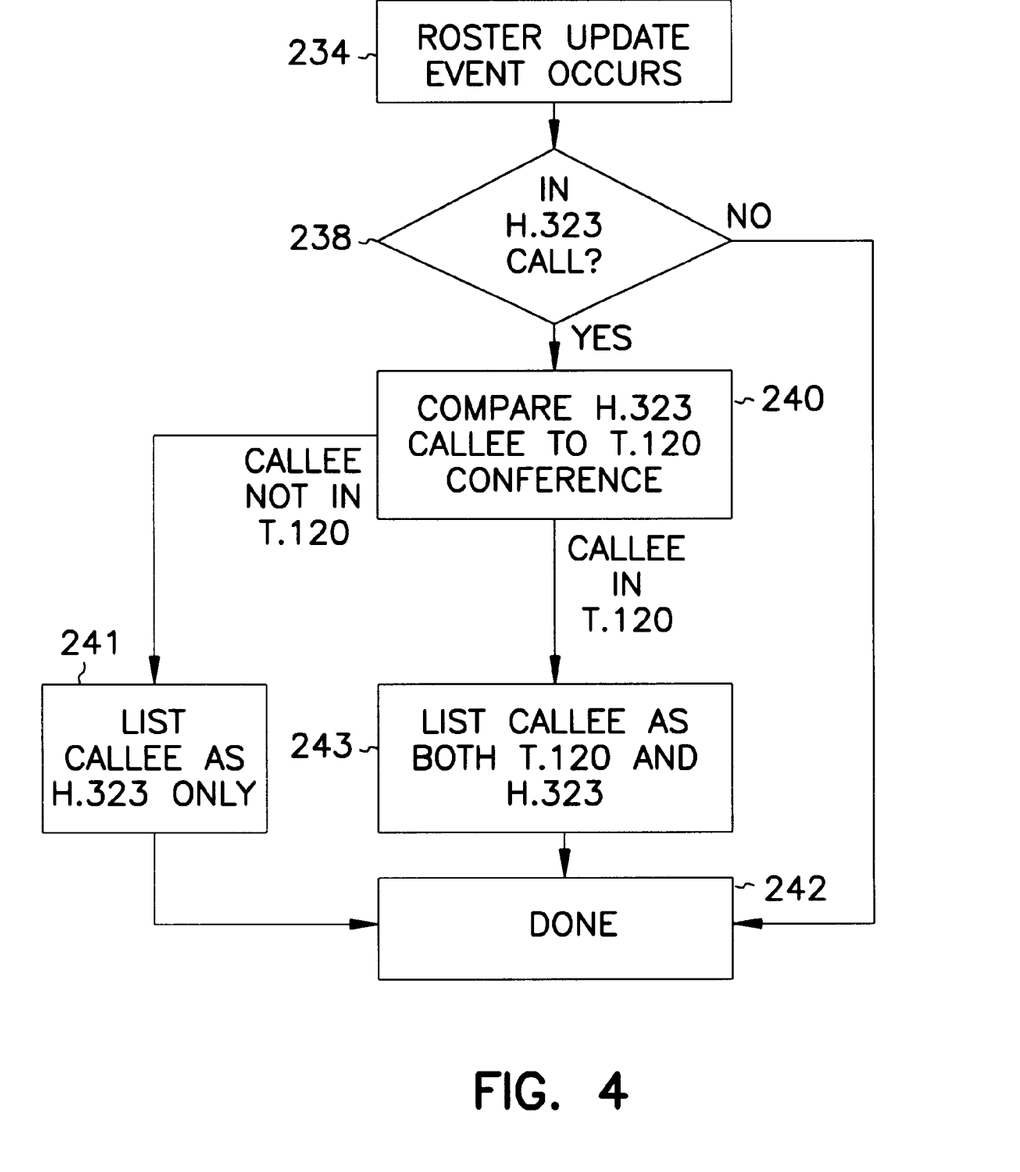

In another embodiment of the invention, which may be used in conjunction with the embodiment just described, each node must combine the T.120 conference roster with its own individual roster of the node with which it is conducting an H.323 call (i.e., this latter roster includes only a single node). This is shown by reference to FIG. 4, which is a flowchart in accordance with one embodiment of the invention. Each time a roster update event occurs, the method of FIG. 4 is performed at the node at which the roster update event occurs. A roster update event takes place for all the nodes in a T.120 conference each time a node joins or leaves the T.120 conference, and also for a particular node whenever an H.323 connection involving that particular node is started or ended.

From the starting point of step 234, if the node at which the roster update event occurred is in an H.323 call, the method proceeds from step 238 to step 240. In step 240, the node compares the address of the node with which it is in an H.323 call (i.e., the callee) to the addresses within the T.120 conference roster maintained as a part of the T.120 standard. If the node finds a match, this means that the callee is both a T.120 conference participant and in an H.323 call with the node, such that in step 243 the callee is listed in a local roster (stored at the node) as both in the T.120 conference and in an H.323 call with the node. Otherwise, in step 241, the callee is listed in a local roster (stored at the node) as not participating in the T.120 conference.

In step 242, the method of FIG. 4 is completed. Thus, in step 242, a local copy of the T.120 conference roster as maintained as a part of the T.120 standard is complete. This local copy of the roster indicates each participant within the T.120 conference, and also indicates, as updated in step 241 or step 243, the H.323 callee node, if an H.323 call is currently being held. The H.323 callee node is indicated as either also in the T.120 conference (step 243), or only within an H.323 call (step 241). Of course, the node itself is listed as within the T.120 conference, and within an H.323 call if that is the case.

The method of FIG. 4 is implemented specifically in one embodiment such that each node creates an entry within the roster, including the IP address or addresses for the node. This data is encoded as T.120 roster data with a registered H.221 application key, as known within the art, and a specially designated QUID, as also known within the art. Using this information, any node within the T.120 conference can compare the single address associated with its current H.323 connection with the addresses supplied by all of the T.120 conference participants. If the address matches, the H.323 connection is not presented as a separate participant in the roster, but instead, the T.120 participant that matched the address appears with additional H.323 capabilities indicated. If the H.323 connection address does not match any of the T.120 participant's addresses, then the H.323 connection appears as a separate entry in the combined roster.

The particular methods performed by the nodes of an exemplary embodiment for an implementation of the invention has been described. The methods include the method by which a caller node establishes a T.120 conference and an H.323 call with a called node. The methods also include the method by which roster information is updated when a node joins or leaves the T.120 conference, or an H.323 call is started or ended, in accordance with one embodiment of the invention.

Conclusion

Combined calling and conferencing has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, the invention is fully intended to cover databases as well as dynamic directories, such that the term directory may be interpreted to encompass any database amenable to the invention in such an embodiment of the invention. Therefore, it is manifestly intended that this invention be limited only by the following claims and equivalents thereof.

I claim:

1. A computerized method comprising:
    a) determining by a first node having conferencing capability and calling capability whether a second node has conferencing capability;
    b) upon determining that the second node has conferencing capability, and where the second node is within a conference,
        joining the conference by the first node;
    c) upon determining that the second node has conferencing capability, and where the second node is without a conference,
        establishing, by the first node, a conference,
        inviting, by the first node, the second node to join the conference, and,
        joining the conference by the second node;
    d) determining by the first node whether the second node has calling capability; and,
    e) upon determining that the second node has calling capability, and where the second node is without a call, establishing, by the first node, a call with the second node.

2. The computerized method of claim 1, further comprising maintaining a roster at at least one of the first and the second nodes of each node present in the conference and whether each node is also in a call.

3. The computerized method of claim 1, further comprising before a), asking a user at the second node whether the user wishes to conference with the first node.

4. The computerized method of claim 1, further comprising within b), asking a user at the first node whether the user wishes to join the conference prior to joining the conference.

5. The computerized method of claim 1, further comprising within c), asking a user at the second node whether the user wishes to disconnect the call prior to disconnecting the call.

6. The computerized method of claim 1, wherein conferencing capability comprises T.120 conferencing capability.

7. The computerized method of claim 1, wherein calling capability comprises H.323 calling capability.

8. A computer-readable medium having computer-executable instructions stored thereon to cause a first node computer having T.120 conferencing and H.323 calling capability to perform a method comprising:

a) determining whether a second node computer has T.120 conferencing capability;

b) upon determining that the second node computer has T.120 conferencing capability, and where the second node computer is within a T.120 conference,
joining the T.120 conference;

c) upon determining that the second node computer has T.120 conferencing capability, and where the second node computer is without a T.120 conference,
establishing a T.120 conference,
inviting the second node computer to join the T.120 conference;

d) determining whether the second node computer has H.323 calling capability; and, e) upon determining that the second node computer has H.323 calling capability,
establishing an H.323 call with the second node computer.

9. The computer-readable medium of claim 8, the method further comprising maintaining a roster of each node computer present in the T.120 conference and whether each node is also in an H.323 call.

* * * * *

UNITED STATES PATENT AND TRADEMARK OFFICE
CERTIFICATE OF CORRECTION

PATENT NO.    : 6,188,676 B1
DATED         : February 13, 2001
INVENTOR(S)   : Pirich It is certified that error appears in the above-identified patent and that said Letters Patent is hereby corrected as shown below:

<u>Title page,</u>
Item [56], References Cited, OTHER PUBLICATIONS,
-- 5,933,417   8/1999   Rottoo.......370/261 -- should be added.

<u>Column 1,</u>
Line 55, "...www.imtc-org..." should read -- ...www.imtc.org... --.

<u>Column 6,</u>
Line 22, "h.323" should read -- H.323 --.

<u>Column 10,</u>
Line 8, "QUID" should read -- GUID --.

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,188,676 B1
DATED : February 13, 2001
INVENTOR(S) : Pirich

It is certified that error appears in the above-identified patent and that said Letters Patent is hereby corrected as shown below:

Title page,
Item [56], References Cited, U.S. PATENT DOCUMENTS,
-- 5,933,417   8/1999   Rottoo.......370/261 -- should be added.

Column 1,
Line 55, "...www.imtc-org..." should read -- ...www.imtc.org... --.

Column 6,
Line 22, "h.323" should read -- H.323 --.

Column 10,
Line 8, "QUID" should read -- GUID --.

This certificate supersedes Certificate of Correction issued March 23, 2004.

Signed and Sealed this

Thirteenth Day of July, 2004

JON W. DUDAS
*Acting Director of the United States Patent and Trademark Office*